Sept. 24, 1968 T. A. CONNOLLY ET AL 3,403,377

APPARATUS FOR MONITORING THE SYNCHRONIZATION OF A PULSE DATA RECEIVER

Filed Sept. 10, 1963 3 Sheets-Sheet 1

THOMAS A. CONNOLLY
DAVID B. KAPLAN
ALFRED D. SCARBROUGH
INVENTORS

BY Arthur Froelich

ATTORNEY

THOMAS A. CONNOLLY
DAVID B. KAPLAN
ALFRED D. SCARBROUGH
INVENTORS

BY Arthur Freilich

ATTORNEY

TABLES

| | (a) F3 | (a) F2 | (a) F1 | (a) COUNT | (b) F3 | (b) F2 | (b) F1 | (b) COUNT |
|---|---|---|---|---|---|---|---|---|
| FULL BIT TIME INTERVAL 1 | F | | 0 | | F | | 0 | |
| | T | 1 | 1 | | T | 1 | 0 | DOWN |
| 2 | F | 0 | 0 | | F | 1 | 0 | UP |
| | T | 1 | 1 | | T | 1 | 0 | DOWN |
| 3 | F | 0 | 0 | | F | 1 | 0 | UP |
| | T | 1 | 1 | | T | 1 | 0 | DOWN |
| 4 | F | 0 | 1 | UP | F | 1 | 0 | UP |
| | T | 0 | 0 | | T | 1 | 0 | DOWN |
| 5 | F | 1 | 0 | UP | F | 1 | 0 | UP |
| | T | 1 | 1 | | T | 1 | 0 | DOWN |
| 6 | F | 0 | 1 | UP | F | 1 | 0 | UP |
| | T | 0 | 0 | | T | 1 | 0 | DOWN |
| 7 | F | 1 | 1 | | F | 1 | 0 | UP |
| | T | 0 | 0 | | T | 1 | 0 | DOWN |
| | F | 1 | | | F | 1 | | UP |

THOMAS A. CONNOLLY
DAVID B. KAPLAN
ALFRED D. SCARBROUGH
INVENTORS

BY Arthur Freilich

ATTORNEY 3,403,377

APPARATUS FOR MONITORING THE SYNCHRONIZATION OF A PULSE DATA RECEIVER

Thomas A. Connolly, Anaheim, and David B. Kaplan and Alfred D. Scarbrough, Los Angeles, Calif., assignors, by mesne assignments, to The Bunker-Ramo Corporation, Stamford, Conn., a corporation of Delaware Filed Sept. 10, 1963, Ser. No. 307,972
10 Claims. (Cl. 340—146.1)

*Origin of the invention*

Figure 1A:
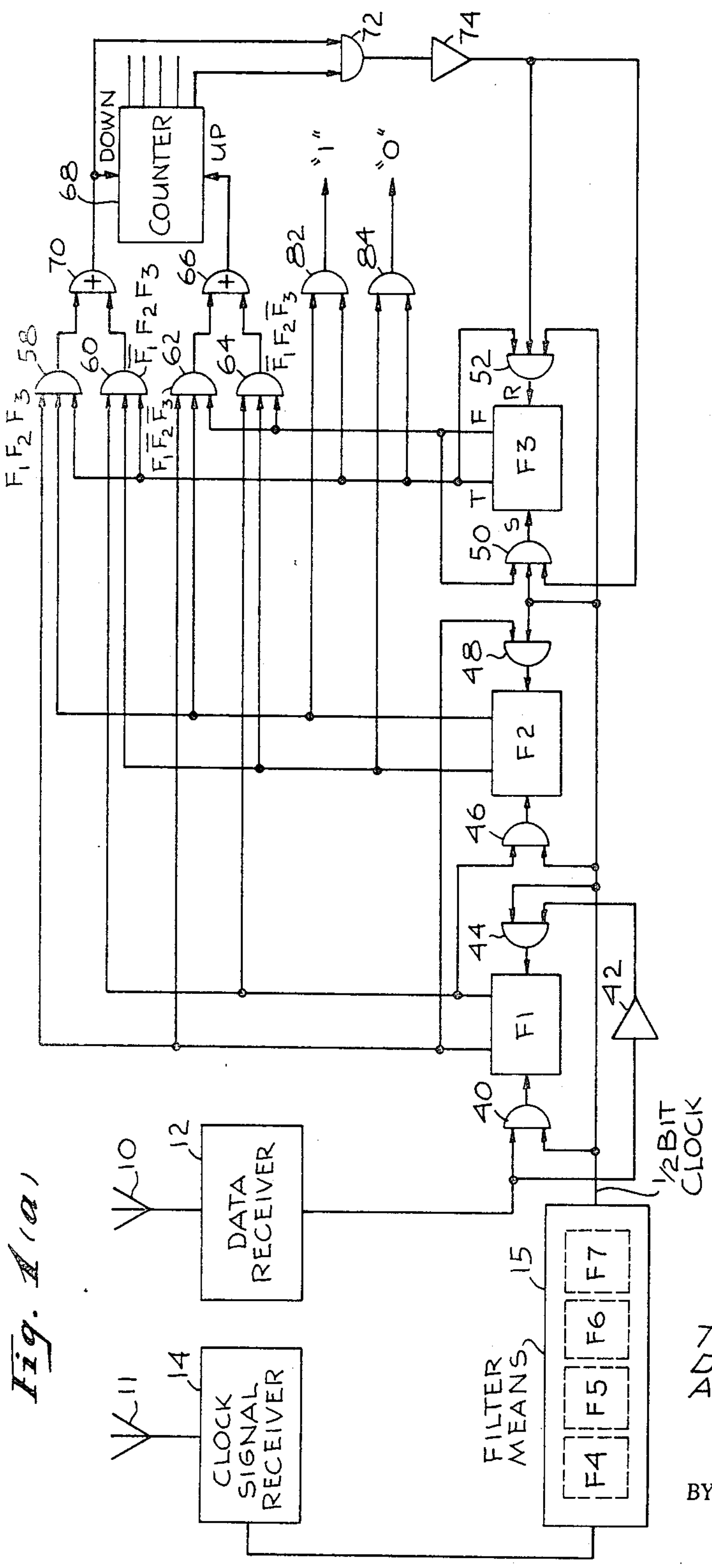

The invention herein described was made in the course of or under a contract or subcontract thereunder, with Department of Navy, Office of Naval Research.

This invention relates generally to digital data communication systems and more particularly to data receiving and processing apparatus for decoding data transmitted in a redundant code.

In many digital data communication systems, as for example between an orbiting satellite and a ground station, where it is expected that environmental conditions will generate noise and otherwise cause loss of transmitted data, it is good practice to transmit such data in some type of redundant code to thereby increase the likelihood that the intelligence of the transmitted message can be determined at the ground station.

One type of redundant code frequently utilized for binary digital data communication is called the Manchester Code and consists of representing each binary digit (bit) by complementary half bits. That is, a full bit equal to binary "1" is represented by an odd half bit equal to binary "1" followed in time by an even half bit equal to binary "0." Similarly, a full bit equal to binary "0" is represented by an odd half bit equal to binary "0" followed in time by an even half bit equal to binary "1." It therefore can be seen that proper interpretation of a series of data signals coded in this manner requires that the correct time or phase relationship of the signals be known. In other words, the interpreting equipment provided in the receiving apparatus must be properly synchronized with the data signals.

In communication systems of the type mentioned however, wherein environmental conditions detrimental to perfect data transmission exist, it is somewhat difficult to properly synchronize the interpreting equipment so as to be able to distinguish odd half bits from even half bits when a string of data bits are serially transmitted. For example, if a string consisting of full bits all equal to binary "1" were transmitted and the receiving apparatus failed to detect the first half bit in the string, it would interpret all subsequent half bits incorrectly, i.e. odd half bits would be interpreted as even half bits and even half bits would be interpreted as odd half bits. Consequently, instead of the receiving apparatus indicating that a string of full bits all equal to binary "1" had been transmitted, it would indicate that a string of full bits, all equal to binary "0" had been transmitted.

In view of the above, it is an object of the present invention to provide data receiving and processing apparatus for use in a digital data communication system in which redundantly coded messages are transmitted, for reliably decoding such messages.

In order to make the digital data being transmitted more intelligible to the data receiving and processing apparatus, it is common practice to transmit clock pulses along with the data, the clock pulses effectively identifying the beginning of each half bit time interval. Inasmuch as the clock pulse transmission channel is subject to effects of noise however, it is desirable to provide a receiving apparatus which includes means for filtering out noise which in the absence of such filtering would appear as a clock pulse.

In view of this, it is an object of this invention to provide a data processing and receiving apparatus including means capable of filtering out noise induced signals whose amplitude or time duration characteristics distinguish them from the clock pulses utilized in the system employing the apparatus.

Regardless of the particular redundancy code utilized, certain valid criteria can be established regarding the received data which tend to indicate whether or not the data is being properly interpreted. For example, where a Manchester Code is employed, any change between what is assumed to be successive full bits indicates that the assumed synchronization or phase relationship is correct and that the data is being properly interpreted. On the other hand, equality between what is assumed to be successive half bits indicates that the assumed synchronization is incorrect and that consequently the data is being improperly interpreted.

Inasmuch as a relatively high rate of spurious data is likely to be encountered in communication systems where redundancy codes are employed, it is not desirable to change the apparatus synchronization upon the initial indication of an improper synchronization but rather, it is desirable to provide some means for comparing the number of times improper synchronization is indicated with the number of times proper synchronization is indicated.

In view of this, it is an additional object of this invention to provide means for establishing a manifestation of what may be considered a confidence level for the synchronization being employed so that this manifestation at all times indicates the probability that the synchronization is correct.

Briefly, the invention herein is based on the recognition that redundantly coded digital data signals whose synchronization or phase relationship must be known in order to properly decode them, can be initially decoded on the basis of an assumed synchronization and a decision as to the propriety of the assumed synchronization can be made by determining whether the data signals, so decoded, comply with or violate certain valid criteria for the known redundancy code employed. The synchronization can then be changed in response to a determination being made that such criteria had been violated. However, in order to eliminate unnecessary changes in synchronization in systems where spurious data signals are to be expected, an additional aspect of the invention is based on the recognition that a confidence level can be established on the basis of the relative number of times the decoded data appears to comply with and violate the criteria so that changes in synchronization are made only in response to a minimum threshold confidence level being reached.

In a preferred embodiment of the invention, a data receiving and processing apparatus is provided capable of distinguishing transmitted clock pulses from noise induced signals by utilization of amplitude and time duration filtering means. The filtering means makes use of four flip-flops which operate in conjunction with a ground station or internal clock pulse source. The first flip-flop is connected so as to assume a true state in response to the concurrence of an input signal to the apparatus being above a threshold amplitude and the generation of a pulse by the internal clock source. A succeeding pulse generated by the internal clock source resets the first flip-flop if the input signal is no longer above the threshold amplitude and additionally sets the second flip-flop in response to the previous setting of the first flip-flop. A succeeding pulse generated by the internal clock source sets the third flip-flop only if the first and second flip-flops are both set. It can therefore be seen that the third flip-flop will be set only if the amplitude and time duration of the input signal were above certain minimum values. The output of the third flip-flop is used to trigger a fourth flip-flop whose output consequently represents the half bit clock pulses transmitted by the transmitting station. These half bit clock pulses are used to switch a toggle flip-flop between its true and false states.

In addition to this treatment of the half bit clock pulses, the transmitted half bit data signals are detected and fed into a pair of flip-flops arranged to comprise a two bit shift register having complementing means between stages. That is, the data bits are serially received and successively applied to a first half data bit flip-flop which in turn shifts the complement of its contents to a second half data bit flip-flop when a subsequent data bit is received. In this manner, adjacent half bits are always stored in the half data bit flip-flops. When the odd half bit is in the second half data bit flip-flop, and the states of the two half data bit flip-flops are identical, the full bit of which said odd half bit forms a part can be determined by reading out the state of the first half data bit flip-flop or the complement of the state of the second half data bit flip-flop. It can be initially assumed that the odd half bit is in the second half data bit flip-flop when the toggle flip-flop is in a true state. If the states of the two half data bit flip-flops are different when the odd half bit is in the second half data bit flip-flop, it is indicative that an error has occurred. Instead of merely changing the synchronization of the toggle flip-flop in response to the error indication a signal representative of the error indication is applied to a counter to incrementally reduce the count therein. The count can be representative of the confidence level of the synchronization.

On the other hand, if successive full data bits are different, as can be determined, when the even half bit is in the second half data bit flip-flop, as indicated by the false state of the toggle flip-flop, the counter can be caused to count up. When the counter reaches a minimum threshold level, the confidence in the synchronization being employed can be considered sufficiently poor to require that the synchronization be changed. Consequently, an inhibit line is connected between the counter and the toggle flip-flop to cause the toggle flip-flop to ignore one half bit clock pulse in response to the counter reaching the minimum threshold level to thereby change its synchronization.

Figure 1B:
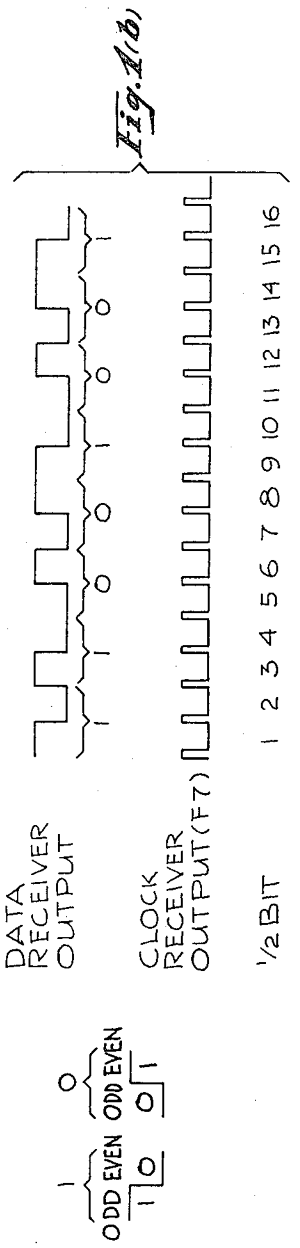
Figure 2A:
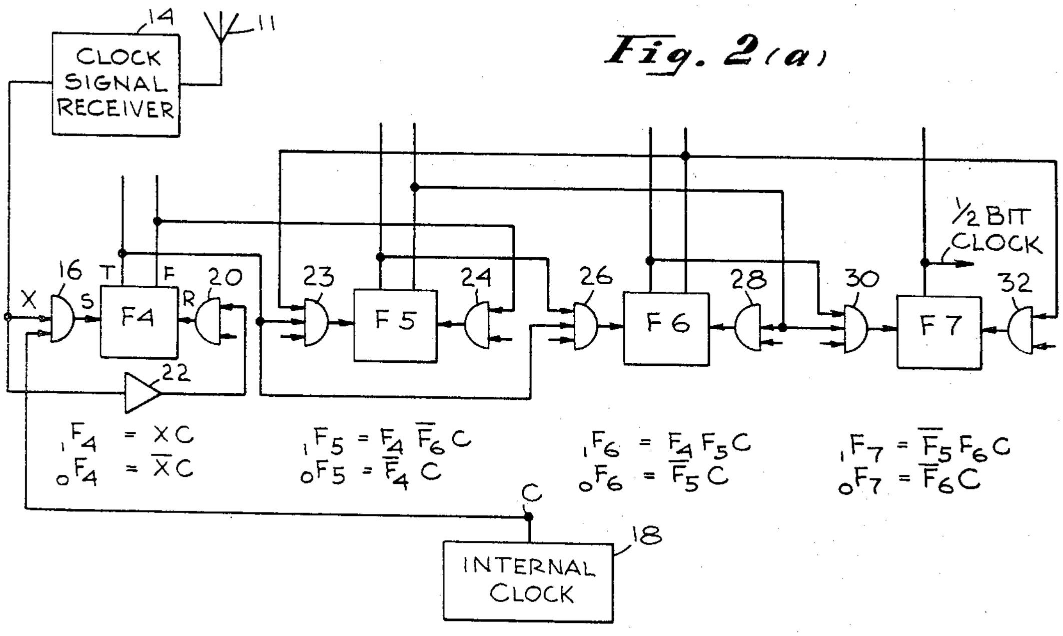
Figure 2B:
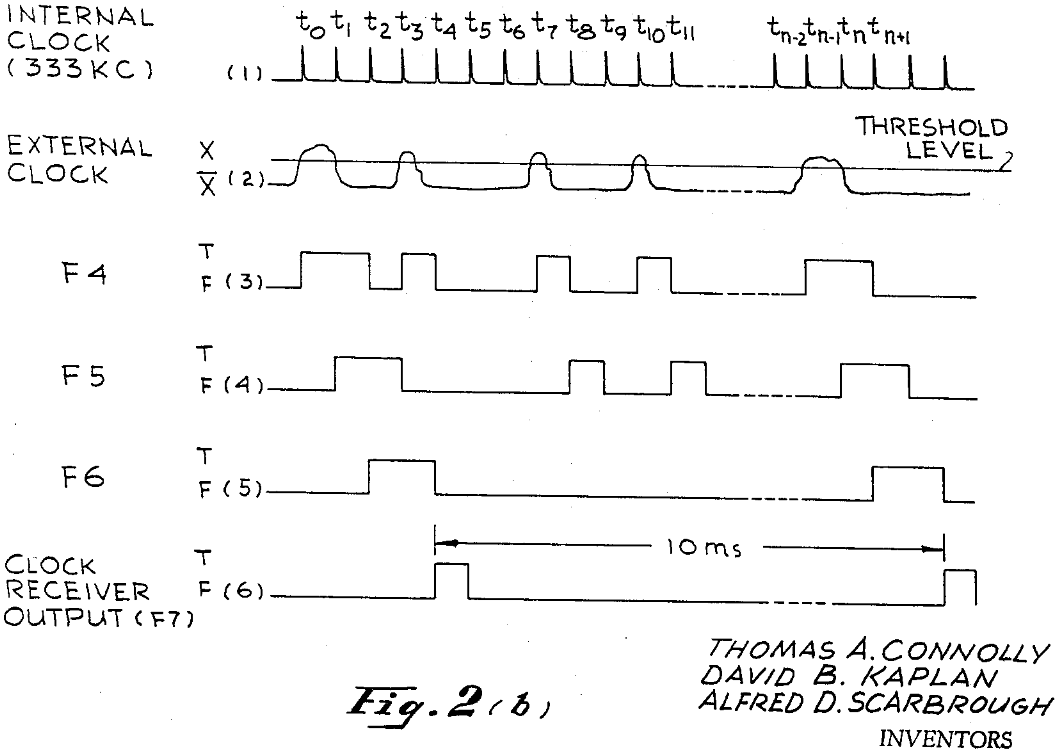
Figures 3, 4:
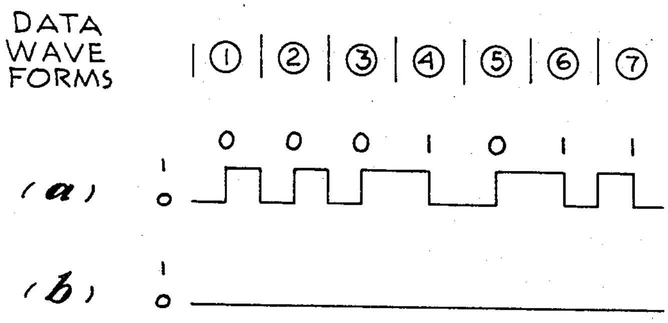

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1*a* is a schematic illustration of the data receiving and processing apparatus in accordance with the present invention;

FIGURE 1*b* is a waveform chart illustrating typical redundantly coded data signals respectively representing a binary "1" and a binary "0" together with an exemplary series of arbitrarily selected binary digits;

FIGURE 2*a* is a schematic diagram of filtering means incorporated in the apparatus of FIGURE 1*a* for enabling the receiver to distinguish between noise induced signals and transmitted clock pulses;

FIGURE 2*b* is a waveform chart which tends to illustrate the operation of the filtering means of FIGURE 2*a*;

FIGURE 3 illustrates two typical waveforms which might be applied to the apparatus of FIGURE 1*a*; and FIGURE 4 comprises two flip-flop state tables which respectively correspond to the waveforms of FIGURE 3.

Attention is now called to FIGURE 1*a* which schematically illustrates an embodiment of the data receiving and processing apparatus constructed in accordance with the invention and adapted to be utilized in a digital data communication system. The transmitting elements of the digital data communication system are not shown but however it is assumed that data and clock signals are respectively transmitted on first and second channels and are respectively picked up by antennas 10 and 11. The antennas 10 and 11 are respectively connected to a data receiver 12 and a clock receiver 14. It shall be assumed that the data is transmitted in the aforementioned Manchester Code, but however it is to be understood that the broad teachings of the invention are equally as applicable to systems utilizing any redundancy code whose interpretation depends on time or phase relationships.

As shown in FIGURE 1*b*, according to the Manchester Code, a digit equal to binary "1" is represented by an initial odd half bit equal to "1" followed in time by an even half bit equal to "0." Conversely, a binary "0" digit is represented by an initial odd half bit equal to "0" followed in time by an even half bit equal to "1." It is apparent that regardless of the value of any full bit, that is whether the bit is a "1" or "0," the manifestation representing it changes state midway during the full bit time interval. The manifestation representing the data could take any of several forms but in a preferred embodiment of the invention, it will be assumed that a low voltage level signal represents "0" and a high voltage level signal represents "1."

Consider now the typical data receiver output waveform shown in FIGURE 1*b*. Note that full bits are received in the following order: 1, 1, 0, 0, 1, 0, 0, 1. Further note that the level of the receiver output either increases or decreases between the half bit periods of full bit time intervals. That is, between half bit periods 1 and 2, the data receiver output level decreases, between half bit periods 3 and 4, the data receiver output level again decreases, but between half bit periods 5 and 6, the data receiver output level increases. In other words, it can be said that the data receiver output level, if the transmitted data is being properly interpreted, will change state at the end of every odd half bit period.

In order for the receiver apparatus of FIGURE 1*a* to know precisely when each half bit period begins, a series of half bit clock pulses are transmitted to the antenna connected to the clock receiver 14. The receiver 14 is provided with a local oscillator whose output, with some noise superimposed thereon, as illustrated in FIGURE 1*b*, is applied to filter means 15. Although the half bit clock pulses do define when a half bit period begins, the clock pulses do not indicate whether it is an odd half bit or an even half bit that is beginning. Of course, in order to properly interpret the transmitted data, it is necessary to know whether each half bit is odd or even. That is, assume that environmental conditions in the communication system cause the first half bit clock pulse to be lost so that the data receiving and processing apparatus actually interprets half bit period 2 as the initial half bit period. Consequently, the data signal received during half bit periods 2 and 3 will be interpreted as a full bit "0" rather than as the second and first halves of successive "1" bits. Moreover, so long as the synchronization remains in error, that is with odd half bits being interpreted as even half bits and vice versa, the data will continue to be interpreted incorrectly so that a series of transmitted "1" bits will be interpreted as a series of "0" bits and conversely, a series of "0" bits will be interpreted as a series of "1" bits.

In order to accurately decode the redundantly coded data available at the output of the data receiver 12, an arbitrary initial assumption can be made as to when the odd and even half data bits occur. By then considering the data interpreted on the basis of the assumed synchronization, certain judgments can be made as to whether the assumed synchronization is correct or incorrect.

More particularly, it is known that if the data is being correctly transmitted, the data receiver output level should never fail to change during a full bit period. Again assume that the indication of the first half bit period is lost and that half bit period 2 is interpreted as the initial half bit period and the half bit periods thereafter are likewise interpreted as if they were occurring one half bit period earlier. Consequently, as previously noted the full bit during half bit periods 2 and 3 will appear as a binary "0." On the other hand, the full bit appearing during half bit periods 4 and 5 will appear neither as a binary "0" or a binary "1" and consequently it becomes apparent that some error has occurred. It is this recognition which provides an initial criterion on which a judgment that an error has occurred can be made when the Manchester Code is being employed. Summarily, the initial criterion can be concisely stated as follows: if the data receiver output signal fails to change at the beginning of what is assumed to be an even half bit period, an error has occurred.

A second criterion can be established upon realizing that if the synchronization is improper, it is not possible for the state of two successive full bits to be different. Consequently, the second criterion can be concisely stated as follows: if two successive full data bits are different, the synchronization is proper.

On the basis of these two criteria, it will hereafter be shown how the data receiver output can be properly interpreted and how proper synchronization can be established. Prior to proceeding with a discussion of the manner in which the data bits are handled, attention is called to FIGURE 2*a* which comprises filtering means 15 connected to the output of receiver 14 for enabling noise induced signals to be distinguished from half bit clock pulses where the noise induced signals are either of low amplitude or shorter duration than the legitimate clock pulses.

The filtering means 15 connected to the clock receiver 14 comprises a flip-flop F4 and three other flip-flops F5, F6 and F7 (it can be assumed for the sake of simplicity that all of the flip-flops shown herein are conventional set-reset flip-flops). The set input terminal of the flip-flop F4 is connected to the output of AND gate 16 whose input is connected to the output of receiver 14. The output of an internal clock 18 operating at a frequency much higher than the frequency of the transmitted clock pulses is also connected to the input of AND gate 16. (Similarly, the output of internal clock 18 is connected to the input of all of the gates of FIGURE 2*a* but however for the sake of clarity, this connection is not shown but rather is expressed in the logical equations provided. The output of AND gate 20 is connected to the reset input terminal of flip-flop F4. The output of the receiver 14 is connected through an inverter 22 to the input of AND gate 20.

The logical equations illustrated in FIGURE 2*a* below the flip-flop F4 summarize the operation of the flip-flop. That is, when a signal above a certain amplitude (represented by the notation X) is applied to the AND gate 16 concurrent with an internal clock pulse (represented by the notation C) the flip-flop F4 is set (i.e. switched true, as represented by the notation $_1F_4$). The flip-flop F4 is reset (i.e. switched false) in response to the generation of an internal clock pulse concurrent with the signal applied to AND gate 16 being below a certain amplitude.

The true output terminal of flip-flop F4 is connected to the input of AND gate 23 whose output is connected to the set input terminal of flip-flop F5. The false output terminal of flip-flop F4 is connected to the input of AND gate 24 whose output is connected to the reset input terminal of flip-flop F5. The false output terminal of flip-flop F6 is connected to the input of AND gate 23. Consequently, flip-flop F5 is set in response to the generation of an internal clock pulse if flip-flop F4 has been previously set and flip-flop F6 is not set. Flip-flop F5 is reset in response to the generation of an internal clock pulse and flip-flop F4 being false.

The true output terminals of flip-flops F4 and F5 are connected to the input of AND gate 26 whose output is connected to the set input terminal of flip-flop F6. The false output terminal of flip-flop F5 is connected to the input of AND gate 28 whose output is connected to the reset input terminal of flip-flop F6. Flip-flop F6 operates such that it is set in response to the generation of an internal clock pulse if both flip-flops F4 and F5 are true. Flip-flop F6 is reset in response to the generation of an internal clock pulse if flip-flop F5 is false.

The false output terminal of flip-flop F5 and the true output terminal of flip-flop F6 are connected to the input of AND gate 30 whose output is connected to the set input terminal of flip-flop F7. The false output terminal of flip-flop F6 is connected to the input of AND gate 32 whose output is connected to the reset input terminal of flip-flop F7.

Flip-flop F7 is set in response to the generation of an internal clock pulse if flip-flop F5 is false and flip-flop F6 is true. Flip-flop F7 is reset in response to the generation of an internal clock pulse if flip-flop F6 is false. The true output terminal of flip-flop F7 is utilized for the purpose of generating half bit clock pulses.

In order to understand the operation of the filtering means of FIGURE 2*a*, attention is called to the waveforms illustrated in FIGURE 2*b*. Let it be initially assumed that the internal clock 18 is operating at some high frequency as for example 333 kilocycles as shown on line 1. Further let it be assumed that the output from the receiver 14 is as illustrated in line 2. The signal from the receiver 14 will be represented by the symbol X whenever it is above the threshold level indicated and by the symbol $X'$ whenever it is below this level.

In the operation of the filtering means of FIGURE 2*a*, it will be noted that flip-flop F4 will be set at time $t_0$ inasmuch as the output of the receiver 14 is above the threshold level. Flip-flop F4 will not be reset at time $t_1$ since the receiver output remains above the threshold level but will be reset at time $t_2$ when the receiver output falls below the threshold level. At time $t_3$, flip-flop F4 is again set and is reset at time $t_4$. Similarly, flip-flop F4 is set at time $t_7$ and reset at time $t_8$, set at time $t_{10}$, and reset at time $t_{11}$, and set at time $t_{n-1}$, and reset at time $t_{n+1}$.

The output waveform of flip-flop F5, illustrated in line 4 of FIGURE 2*b*, can be derived from the logical equations shown in FIGURE 2*a*. It will be noted that the output waveform of flip-flop F5 is similar to the output waveform of flip-flop F4 except that it is delayed by one internal clock pulse period and does not reflect certain one pulse interval signals apparent in the output waveform of flip-flop F4. The output waveform of flip-flop F6 shown in line 5 of FIGURE 2*b* is delayed one pulse interval from the output waveform of flip-flop F5 and does not reflect any of the one pulse time interval signals present in the output waveform of flip-flop F5. The output waveform of flip-flop F6 does however reflect the output signals of flip-flop F5 extending over two internal clock pulse intervals.

In other words, flip-flop F6 provides a true output only when true output signals from flip-flops F4 and F5 overlap in time. As a consequence of this, flip-flop F6 is set only in response to signals supplied by the receiver 14 which are above a certain threshold amplitude and of at least a certain minimum time duration. Assuming the internal clock to be operating at 333 kilocycles, the spacing between internal clock pulses is 3 microseconds. Accordingly, unless the signal derived from the receiver 14 is at least 3 microseconds in duration, flip-flop F6 will not be set. By assuring that the output pulses derived from the local oscillator in receiver 14 have a duration greater than 3 microseconds, all noise induced signals which can be distinguished from such clock pulses by virtue of the fact that they have a duration less than 3 microseconds can be effectively filtered out.

The output of flip-flop F6 is utilized to drive flip-flop F7 whose output waveform is shown in line 6 of FIGURE 2*b*. The output of flip-flop F7 provides the half bit clock pulses shown in FIGURE 1*b* which are utilized to define the beginning of successive half bit data periods.

Returning now to the schematic illustration of the data receiving and processing apparatus shown in FIGURE 1*a*, it will be noted that the output lines of the data receiver 12 and filter means 15 are applied to the input of an AND gate 40 whose output is connected to the set input terminal of flip-flop F1. Additionally, the output of data receiver 12 is connected through an inverter 42 to the input of an AND gate 44 whose output is connected to the reset input terminal of the flip-flop F1. The false output terminal of the flip-flop F1 is connected to the input of AND gate 46 whose output is connected to the set input terminal of flip-flop F2 while the true output terminal of flip-flop F1 is connected to the input of AND gate 48 whose output terminal is connected to the reset input terminal of flip-flop F2. The output of filter means 15 is connected to the inputs of AND gates 44, 46, and 48.

A toggle flip-flop F3 is provided and has AND gates 50 and 52 respectively connected to the set and reset input terminals thereof. The output of filter means 15 is connected to the input of AND gates 50 and 52 while the true output terminal of flip-flop F3 is connected to the input of the AND gate 52 and the false output terminal of the flip-flop F3 is connected to the input of AND gate 50. The true output terminal of flip-flop F3 is additionally connected to the input of AND gates 58 and 60. The false output terminal of flip-flop F3 is additionally connected to the input of AND gates 62 and 64. The outputs of flip-flops F1 and F2 are connected to the AND gates 58, 60, 62, and 64 such that the output of AND gate 58 is true when flip-flops F1 and F3 are true and flip-flop F2 is false, the output of AND gate 60 is true when the output of flip-flop F1 is false and flip-flops F2 and F3 are true, the output of AND gate 62 is true when flip-flop F1 is true and flip-flops F2 and F3 are false, and the output of AND gate 64 is true when flip-flop F2 is true and flip-flops F1 and F3 are false.

The outputs of AND gates 62 and 64 are connected to the input of an OR gate 66 whose output is connected to a first input terminal of a counter 68. The outputs of AND gates 58 and 60 are connected to the input of an OR gate 70 whose output is connected to a second input terminal of a counter 68.

In response to the application of true signals to the first and second input terminals of the counter 68, the counter is respectively caused to increment either upwardly or downwardly. That is, when the output of AND gate 66 is true, the counter 68 will count up while when the output of AND gate 70 is true, the counter 68 will count down. Although a counter of any capacity and any configuration can be utilized in accordance with the teachings herein, it will be assumed that the counter is capable of counting up incremetally from zero to three and down incrementally from three to zero. The counter should be inhibited from cycling, i.e. from counting up to zero from a count of three. The counter output terminal which is made true when the counter stores a count of zero is connected to the input of an AND gate 72 together with the output of OR gate 70. The output of AND gate 72 is connected through an inverter 74 to the input of AND gates 50 and 52.

In the operation of the data receiving and processing apparatus of FIGURE 1*a*, the output of the data receiver 12 is gated into flip-flop F1 upon the generation of every half bit clock pulse derived from filter means 15. It was previously indicated that the internal clock signal is of much greater frequency than the external clock signal received by antenna 11 and it was suggested that an exemplary value for the frequency of the internal clock could be 333 kilocycles so that the interval between internal clock pulses is approximately 3 microseconds. Let it arbitrarily be assumed that the half bit clock pulses occur every 10 milliseconds so that a full data bit is presented in 20 milliseconds.

As noted, a first half bit clock pulse will gate the output of the data receiver 12 through AND gate 40 and will either set or reset flip-flop F1. The next half bit clock pulse will enter a new half data bit into flip-flop F1 and will shift a complemented half bit from flip-flop F1 into flip-flop F2. Let it be initially assumed that the first half bit clock pulse causes flip-flop F3 to be reset and that the second half bit clock pulse causes flip-flop F3 to be set. Let it also be assumed that when the flip-flop F3 is set, that is in its true state, the flip-flop F2 stores the complement of an odd half data bit and that the flip-flop F1 stores an even half data bit. Accordingly, if the states of flip-flops F1 and F2 are different when flip-flop F3 is true, a conclusion can be reached that an error, either in transmission or synchronization, has occurred since in accordance with the previously enunciated first criterion, successive odd and even half data bits cannot be equal. If the states of the flip-flops F1 and F2 are different, either AND gate 58 or 60 will provide an output signal and thereby cause OR gate 70 to generate a signal indicating that the phase or synchronization of the flip-flop F3 is incorrect. This signal incrementally reduces the count in counter 68. As noted, since the error might not be due to an error in synchronization but rather due to some transmission difficulties, it is not desirable to immediately change the synchronization of the receiver, that is inhibit flip-flop F3 from switching for one half bit clock pulse.

In accordance with the second criterion, when it is assumed that a complemented even half data bit is in the flip-flop F2 and an odd half bit is in flip-flop F1, which would be the situation when the toggle flip-flop F3 is false, a conclusion can be reached that the synchronization is correct if the states of the flip-flops F1 and F2 are different. Realizing that the state of flip-flop F2 represents the complement of the even half data bit, it can be seen that when the states of flip-flops F1 and F2 are different, it in fact means that the true value of the odd and even half data bits they store are the same and therefore it can be concluded that the states of two successive full bits are different. Consequently, a conclusion can be reached that the synchronization is correct. When this situation arises, OR gate 66 will provide a true output signal ("correct phase" signal) indicating that the synchronization is correct and as a consequence thereof the counter 68 will be caused to count up.

The count in the counter 68 at all times represents what might be considered the confidence level of the synchronization presently being employed. That is, so long as the counter 68 stores a count of three, one can be confident that the synchronization is correct. However, as the counter is incrementally reduced toward zero, the confidence level in the synchronization proportionately falls and when a count of zero is reached, the synchronization is changed by inhibiting the toggling of the flip-flop F3 for one half bit clock pulse.

For a clearer understanding of the manner in which the flip-flops F1, F2, F3, and appropriate gating circuitry apply the aforementioned criteria to determine whether the synchronization is correct, consider the arbitrary data waveforms shown on lines *a* and *b* of FIGURE 3 and the corresponding state tables *a* and *b* of FIGURE 4. Initially considering the data waveforms *a*, note that the waveform consists of seven full bits in the following order: 0, 0, 0, 1, 0, 1, 1. Of course this series of full bits will result in the flip-flop F1 successively storing the half data bits indicated in the table *a*. As a result of the shifting and complementing between the flip-flop F1 and F2, the flip-flop F2 stores the half data bits at the times indicated. Note that full bits 1, 2, and 3 of data waveform *a* are all identical but that full bit 4 is different from full bit 3. This can be determined when the even half bit of full bit 3 is in flip-flop F2 and the odd half bit of full bit 4 is in flip-flop F1. If these half bits are different, as is indicated in the table *a* when flip-flop F3 is false, the counter 68 should be caused to count up in accordance with the previously mentioned second criterion, i.e, a change between successive full bits indicates that the synchronization is correct. Similarly, full bit 5 of data waveform *a* is different from full bit 4 and as a consequence the next time flip-flop F3 is false, thereby indicating that an even half bit is in flip-flop F2, it can again be noted that the contents of flip-flops F1 and F2 are different and that as a result the counter 68 should be caused to count up. The same situation can be observed when the even half bit of full bit 6 is stored in flip-flop F2.

In the event that the data receiver 12 is unable to distinguish "0" half data bits from "1" half data bits and its output waveform therefore appears as shown on line *b* of FIGURE 3, there is no point in changing the synchronization of flip-flop F3 back and forth of course because apparently synchronization is not the problem but rather some transmission problems exist which of course would not be helped by a change in synchronization. It will be noted from table *b* that the implementation of FIGURE 1*a* will not cause the counter to count down to zero to thereby change the synchronization of the toggle flip-flop F3 but will merely cause the counter 68 to alternately incrementally increase and decrease its count by one so long as the condition represented by the waveform *b* of FIGURE 3*b* persists.

A further point should be recognized. Inasmuch as a series of full "1" data bits will appear as a series of full "0" data bits if the synchronization is incorrect and since the first aforementioned criterion will not be violated so long as such a situation exists, and consequently since the synchronization will not thereby be changed, it is advisable to require the transmitter to periodically provide a short series of full bits including both "1's" and "0's" to enable the toggle flip-flop F3 to become synchronized.

It has been shown that when flip-flop F3 is in a true state, flip-flop F2 stores the complement of an odd half bit. Consequently, by taking the complement of the state of flip-flop F2 when flip-flop F3 is true, the value of the full bit whose complemented odd half bit is stored in flip-flop F2, can be determined. The AND gates 82 and 84 are provided to make this determination; i.e. the true output terminal of flip-flop F3 is connected to the inputs of AND gates 82 and 84 together with the false and true output terminals of flip-flop F2 respectively. The outputs of gates 82 and 84 are connected to some external device, e.g. a digital computer. When the output of gate 82 is true, a full data bit "1" is indicated and when the output of gate 84 is true, a full data bit "0" is indicated.

From the foregoing, it should be realized that a data receiving and processing apparatus has been described herein for decoding redundantly coded digital data signals. More particularly, it has been shown how transmitted clock pulse signals can be received and filtered and then utilized with transmitted data signals to decode the data signals based on some assumed synchronization and certain criteria which are valid for the redundant code utilized. By determining whether the data interpreted in the light of the assumed synchronization violates or complies with the criteria, a counter can be operated to establish a synchronization confidence level. When a low level of confidence is reached, it can be concluded that the synchronization is incorrect and in response to such a conclusion, the synchronization can be changed.

The embodiments of the invention in which the exclusive property or privilege is claimed are defined as follows:

1. In a digital data communication system in which digits are represented by a manifestation according to some redundant code of the type in which the phase relationship between each manifestation and other manifestations must be known in order to properly interpret said digits, means for interpreting said digits comprising:
 means for storing selected manifestations;
 means for comparing said stored manifestations on the basis of an assumed phase relationship in accordance with some predetermined criteria; and
 means for changing said assumed phase relationship in response to said manifestations violating said predetermined criteria.

2. Means for decoding a series of digital data manifestations coded in a redundant code of the type in which the phase relationships of said manifestations must be known in order for them to be decoded, said means comprising:
 means for decoding said data manifestations in accordance with a first phase relationship and for determining whether said manifestations violate a predetermined criterion for said redundant code;
 means for developing an error manifestation in the event said criterion is violated; and
 means responsive to the development of said error manifestation for decoding said data manifestations in accordance with a second phase relationship.

3. Means for decoding a series of digital data manifestations coded in a redundant code of the type in which the phase relationships of said manifestations must be known in order for them to be decoded, said means comprising:
 comparison means for comparing adjacent data manifestations in said series;
 means responsive to said comparsion means for determining in accordance with a first phase relationship whether said data manifestations violate a predetermined criterion for said redundant code;
 means for developing an error manifestation in the event said citerion is violated;
 decoding means for selectively decoding said data manifestations in accordance with either said first or a second phase relationship; and
 means responsive to the development of said error manifestation for causing said decoding means to decode in accordance with said second phase relationship.

4. Means for decoding a series of digital data manifestations coded in a redundant code of the type in which the phase relationships of said manifestations must be known in order for them to be decoded, said means comprising:
 means for decoding said data manifestations in accordance with a first phase relationship;
 means for determining whether adjacent data manifestations in said series violate a first predetermined criterion for said redundant code when said manifestations are decoded in accordance with said first phase relationship;
 means for generating an "incorrect phase" manifestation in response to each violation of said first criterion;
 means for determining whether said data manifestations comply with a second predetermined criterion for said redundant code when said manifestations are decoded in accordance with said first phase relationship;
 means for generating a "correct phase" manifestation in response to each compliance with said second criterion;
 means for counting the difference between the number of "incorrect phase" and "correct phase" manifestations generated; and
 means responsive to a predetermined difference for decoding said manifestations in accordance with a second phase relationship.

5. In a binary digital data communication system in which data is transmitted from a transmitting to a receiving station in a redundant code of the type in which data bits are represented by different odd and even half bits such that "1" bits are represented by successive "1" and "0" half bits and "0" bits are represented by successive "0" and "1" bits, means for decoding a series of such half bits including:
- first and second binary storage devices;
- a source of successive clock pulses;
- means responsive to said clock pulses for successively entering each half bit in said series together with the half bit subsequent thereto in said series into said first and second binary storage devices;
- a binary toggle device responsive to each of said clock pulses for switching state;
- means for comparing the half bits stored in said first and second binary storage devices; and
- means responsive to said comparing means and the state of said toggle device for inhibiting said toggle device from switching in response to one of said clock pulses.

6. In a binary digital data communication system in which data is transmitted from a transmitting to a receiving station in a redundant code of the type in which data bits are represented by different odd and even half bits such that "1" bits are represented by successive "1" and "0" half bits and "0" bits are represented by successive "0" and "1" bits, means for decoding a series of such half bits including:
- a shift register including first and second binary storage devices;
- means for successively entering each of said series of half bits into said first storage device and for shifting a half bit in said first storage device into said second storage device;
- a binary toggle device;
- means for causing said toggle device to change state each time a half bit is entered into said first binary storage device;
- logic means for comparing for identity the half bits stored in said first and second storage devices and for generating a first signal in response to said half bits being identical and for generating a second signal in response to said half bits being different;
- means responsive to one of said signals generated by said logic means and one of the states of said toggle device for generating an "incorrect phase" manifestation; and
- means responsive to the generation of said "incorrect phase" manifestation for inhibiting said toggle device from changing state concurrent with the entry of one of said half bits into said first binary storage device.

7. In a binary digital data communication system in which data is transmitted from a transmitting to a receiving station in a redundant code of the type in which data bits are represented by different odd and even half bits such that "1" bits are represented by successive "1" and "0" half bits and "0" bits are represented by successive "0" and "1" bits, means for decoding a series of such half bits including:
- first and second binary storage devices;
- a source of successive clock pulses;
- means responsive to said clock pulses for successively entering successive ones of said series of half bits into said first binary storage device;
- means responsive to said clock pulses for shifting the half bit in said first binary storage device into said second binary storage device;
- a binary toggle device responsive to each of said clock pulses for switching state;
- means for comparing the half bits in said first and second binary storage devices and for indicating whether said half bits are identical or different;
- means responsive to a first state of said toggle device and an indication that said half bits stored in said first and second binary storage devices are identical for generating a "correct phase" signal and responsive to an indication that said half bits are different for generating an "incorrect phase" signal;
- means for determining the difference between the number of "correct phase" and "incorrect phase" signals generated; and
- means responsive to a predetermined difference for inhibiting said toggle device from switching in response to one of said clock pulses.

8. In a binary digital data communication system in which data is transmitted from a transmitting to a receiving station in a redundant code of the type in which data bits are represented by different odd and even half bits such that "1" bits are represented by successive "1" and "0" half bits and "0" bits are represented by successive "0" and "1" bits, means for decoding a series of such half bits including:
- a source of successive clock pulses;
- means responsive to each successive clock pulse for comparing each successive half bit in said series with the half bit subsequent thereto;
- a binary device for switching states in response to each successive clock pulse;
- means for decoding the half bits concurrently being compared when said binary device is in a first of its states;
- means responsive to the comparison of each of said half bits with the half bit subsequent thereto and the state of said binary device for selectively generating "incorrect phase" signals; and
- means responsive to the generation of an "incorrect phase" signal for inhibiting the switching of said binary device in response to one of said clock pulses.

9. In a binary digital data communication system in which data is transmitted from a transmitting to a receiving station in a redundant code of the type in which data bits are represented by different odd and even half bits such that "1" bits are represented by successive "1" and "0" half bits and "0" bits are represented by successive "0" and "1" bits, means for decoding a series of such half bits including:
- a source of successive clock pulses;
- means responsive to each successive clock pulse for comparing each successive half bit in said series with the half bit subsequent thereto;
- a binary device for switching states in response to each successive clock pulse;
- means for decoding the half bits concurrently being compared when said binary device is in a first of its states;
- means responsive to the comparison of each of said half bits with the half bit subsequent thereto and the state of said binary device for selectively generating "correct phase" and "incorrect phase" signals;
- means for determining the difference between the number of "correct phase" and the number of "incorrect phase" signals generated; and
- means responsive to a predetermined difference for inhibiting the switching of said binary device in response to one of said clock pulses.

10. The decoding means of claim 9 wherein said means for determining said difference includes a counter; and
- means responsive to the generation of "correct phase" signals for causing the counter to increment in a first direction and responsive to the generation of "incorrect phase" signals for causing the counter to increment in a second direction.

References Cited

UNITED STATES PATENTS

| | | | |
|---|---|---|---|
| 3,251,034 | 5/1966 | Goode et al. | 340—146.1 |
| 3,127,475 | 3/1964 | Coulter | 179—15 |

MALCOM A. MORRISON, *Primary Examiner.*

V. SIBER, *Assistant Examiner.*